United States Patent

Wood et al.

[11] 4,122,595
[45] Oct. 31, 1978

[54] SCORED RUPTURE DISK MANUFACTURING METHOD

[75] Inventors: Loren E. Wood; John E. Witten; Edward H. Short, III, all of Tulsa, Okla.

[73] Assignee: Black, Sivalls & Bryson, Inc., Houston, Tex.

[21] Appl. No.: 824,161

[22] Filed: Aug. 12, 1977

[51] Int. Cl.² ............................................. B23P 17/00
[52] U.S. Cl. .................................... 29/424; 29/527.2; 29/527.4; 29/407; 113/116 B; 113/116 V; 113/116 QA
[58] Field of Search ............... 220/89 A; 29/424, 407, 29/527.2, 527.4; 113/116 B, 116 V, 116 QA

[56] References Cited

U.S. PATENT DOCUMENTS

| 3,693,691 | 9/1972 | Summers | 220/89 A |
| 3,704,807 | 12/1972 | Lidgard | 220/89 A |
| 3,834,580 | 9/1974 | Ludwig et al. | 220/89 A |
| 3,921,556 | 11/1975 | Wood et al. | 113/120 R |

Primary Examiner—C.W. Lanham
Assistant Examiner—V. K. Rising
Attorney, Agent, or Firm—Laney, Dougherty, Hessin & Beavers

[57] ABSTRACT

The present invention relates to improved methods of manufacturing scored rupture disks whereby a coating of corrosion-resistant material is applied to the disks so that a score pattern is left unprotected thereon and the disks are contacted with a corrosive fluid for a period of time sufficient to corrode scores corresponding with the score pattern into the disks.

9 Claims, 6 Drawing Figures

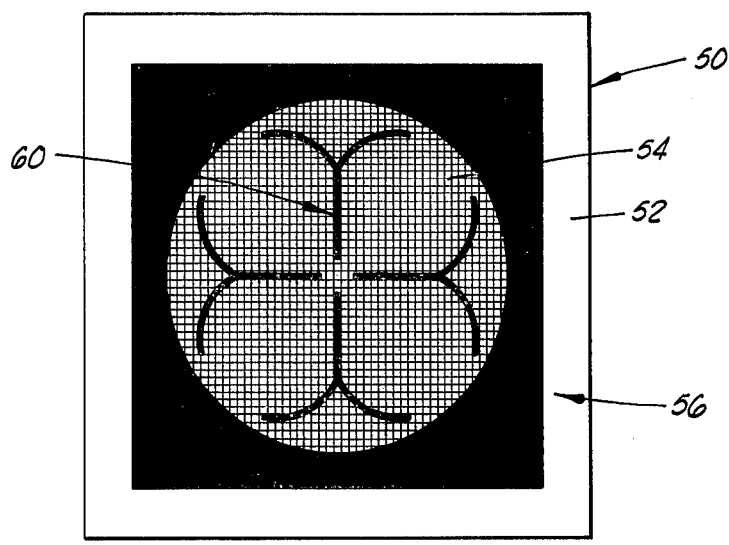
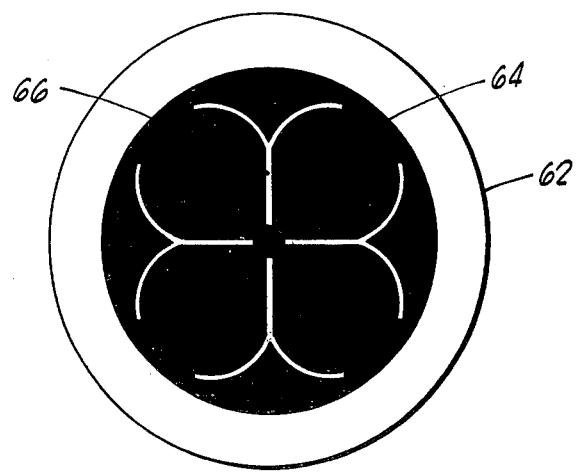
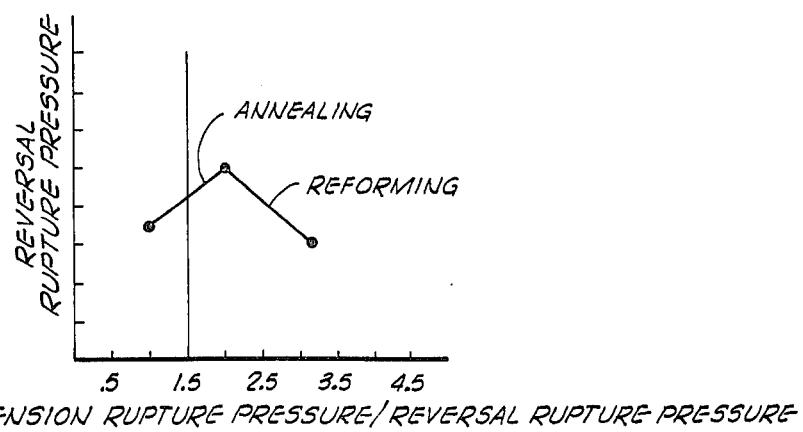

SCORED RUPTURE DISK MANUFACTURING METHOD

BACKGROUND OF THE INVENTION

1. Field of the Invention

The present invention relates generally to an improved scored rupture disk manufacturing method, and more particularly, but not by way of limitation, to methods of manufacturing scored rupture disks of both conventional and reverse buckling rupture types whereby the scores are formed in the disks by corrosion.

2. Description of the Prior Art

A variety of safety pressure relief devices of the rupture disk type have been developed and used. Generally, these devices include a fluid pressure rupturable member or disk supported between a pair of supporting members which are in turn connected to a relief connection in a vessel or system containing fluid pressure. When the pressure within the vessel or system exceeds the design rupture pressure of the rupture disk, rupture occurs causing excess fluid pressure to be relieved from the vessel or system.

Heretofore, two general types of rupture disks have been used, namely, the so-called "conventional" disk which includes a concave-convex dome portion positioned whereby fluid pressure from the vessel or system being protected is exerted on the concave side of the dome portion placing the disk in tension, and the so-called "reverse buckling" disk which also includes a concave-convex dome portion, but which is positioned with respect to the vessel or system being protected so that fluid pressure is exerted on the convex side of the dome portion placing the disk in compression. In both conventional and reverse buckling rupture disks, scores have been utilized for creating lines of weakness therein so that upon rupture, the disks tear along the lines of weakness in a predetermined pattern. As used herein, the term "scores" means elongated grooves or other lines of relative thinness formed in a rupture disk.

While conventional disks are presently being used, they are generally confined to applications where the design rupture pressure of the disk is considerably higher than the level of fluid pressure normally exerted on the disk from the vessel or system being protected. If such conventional disks are utilized in applications where the design rupture pressure of the disk is close to the normal fluid pressure exerted on the disk, premature stress failure of the disk can result. Because reverse buckling rupture disks are placed in compression by the fluid pressure exerted thereon, the pressure at which the disk is designed to rupture can be relatively close to the normal fluid pressure exerted on the disk. Further, reverse buckling rupture disks can withstand pressure fluctuations within the vessel or system over a long period of time without premature failure. However, problems have been encountered in the use of scored reverse buckling rupture disks in that such disks sometimes reverse erratically or reverse but do not tear open. In this event, unless the disks are manufactured in a manner whereby the ratio of tension rupture pressure to reversal rupture pressure is low, the fluid pressure required to rupture the disks in tension after reversal can exceed the design rupture pressure of the disks by a considerable amount creating an extremely dangerous over-pressure condition in the vessels or systems intended to be protected.

The heretofore used methods of manufacturing reverse buckling scored rupture disks have generally included forming concave-convex dome portions in the disks to a specific crown height followed by forming scores on one side of the concave-convex dome portion. The scores are formed by forceably contacting the disks with a sharpened blade so that compressed metal indentations are formed in the disks in a desired pattern. A description of this technique is set forth in U.S. Pat. No. 3,921,556 which is assigned to the assignee of this present invention. The techniques of forming scores by forceable contact with a blade or similar tool leaves much to be desired in that the scores formed are often of non-uniform depths, and because the metal is work-hardened by contact with the score blade, problems are encountered in both the manufacture and use of the rupture disks produced. Further, for a particular score blade, only disks of a specific crown height can be scored decreasing the flexibility in design of the disks and increasing the number of steps required to manufacture a group of such rupture disks to design specifications.

By the present invention, an improved method of manufacturing scored rupture disks, both conventional and reverse buckling types, is provided which is economical to carry out as compared to heretofore used manufacturing methods and which obviates the problems mentioned above. Further, the improved method of manufacturing scored reverse buckling rupture disks of the present invention allows greater flexibility in the design of such disks without sacrificing accuracy or efficiency.

SUMMARY OF THE INVENTION

A method of manufacturing a scored rupture disk comprising the steps of forming a flat section of sheet metal into a desired peripheral shape, applying a coating of flexible corrosion-resistant material to one side of the section in a manner whereby a score pattern is left unprotected on a portion of the section, forming the portion of the section containing the score pattern into a concave-convex dome shape, contacting the side of the concave-convex dome portion containing the score pattern with a corrosive fluid for a period of time sufficient to corrode scores corresponding with the score pattern of desired depth into the section, and removing the corrosion-resistant material from the section.

It is, therefore, an object of the present invention to provide an improved scored rupture disk manufacturing method.

A further object of the invention is the provision of a method of manufacturing scored rupture disks which allows a greater flexibility in the design of the disks and is more economical to carry out than heretofore used manufacturing methods.

Another object of the present invention is the provision of a method of manufacturing a group of scored reverse buckling rupture disks whereby each of such disks has a known reversal rupture pressure.

Yet another object of the present invention is the provision of an improved method of manufacturing scored reverse buckling rupture disks whereby the disks produced rupture in tension at a pressure no greater than 1.5 times the reversal rupture pressure of the disks.

Other and further objects, features and advantages of the invention will be readily apparent from the following description of presently preferred embodiments,

BRIEF DESCRIPTION OF THE DRAWINGS

FIG. 4 is a top plan view of an apparatus for applying a coating of corrosion-resistant material to a rupture disk whereby a score pattern is left unprotected on a portion of the disk;

FIG. 5 is a top plan view of a disk having a coating of corrosion-resistant material applied thereto; and FIG. 6 is a graph illustrating the effect of reforming and annealing on the ratio of tension rupture pressure to reversal rupture pressure.

DESCRIPTION OF PREFERRED EMBODIMENTS

Figure 1:
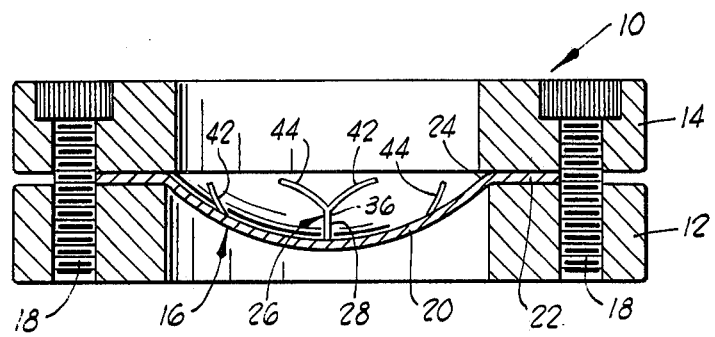
FIG. 1 is a side cross-sectional view of a typical safety pressure relief apparatus including a scored rupture disk.
Figure 2:
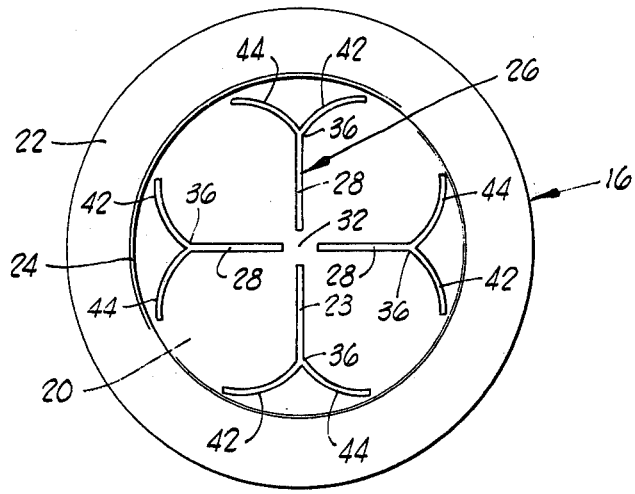
FIG. 2 is a top plan view of the rupture disk of FIG. 1.
Figure 3:
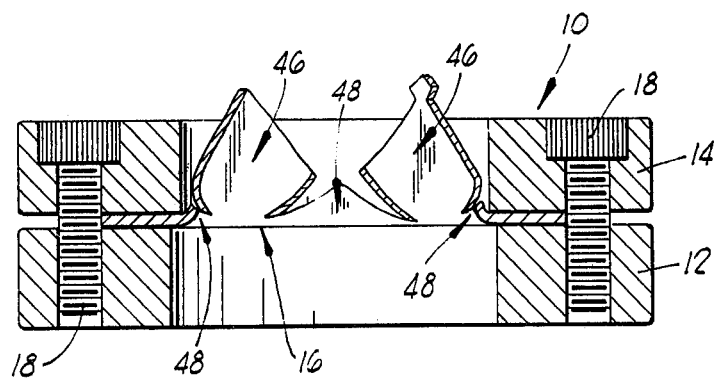
FIG. 3 is a side cross-sectional view of the apparatus of FIG. 1 illustrating the apparatus after rupture has occurred.

Referring now to the drawings and particularly to FIGS. 1-3, a typical pressure relief apparatus including a scored rupture disk is illustrated and generally designated by the numeral 10. The apparatus 10 basically comprises a pair of supporting members 12 and 14 between which a scored rupture disk 16 is sealingly clamped by a plurality of cap screws 18 positioned around the peripheral portions of the supporting members. The supporting members 12 and 14 can take a variety of forms, as for example, flanges which are adapted for welding or threading, or members which are adapted for clamping between conventional pipe flanges or the like.

The rupture disk 16 can also take a variety of forms and shapes. In the embodiment illustrated in the drawings, the rupture disk 16 is circular in shape and includes a central concave-convex dome portion 20 connected to an annular flat flange portion 22 by a transition connection 24. In this form, the annular flat flange portion 22 of the rupture disk 16 is clamped between complementary annular flat seating surfaces provided on the supporting members 12 and 14 so that the rupture disk 16 is sealingly supported between the members 12 and 14. However, the rupture disk 16 can be entirely concave-convex, or instead of the annular flat flange portion 22 and the complementary flat annular seating surfaces on the supporting members 12 and 14, other seating shapes and arrangements can be utilized.

If the rupture disk 16 is conventional, i.e., ruptures in the conventional manner, the fluid pressure from the vessel or system being protected is communicated by way of the supporting member 14 to the concave side of the rupture disk. When the fluid pressure exerted on the concave side of the disk 16 exceeds the pressure at which the disk is designed to fail, the tensile strength of the disk is exceeded and the disk ruptures.

If the disk 16 is a reverse buckling rupture disk, the fluid pressure from the vessel or system being protected is communicated by way of the supporting member 12 to the convex side of the concave-convex portion 20. When the fluid pressure exerted on the convex side of the disk 16 exceeds the pressure at which the disk is designed to fail, the concave-convex portion 20 reverses itself and rupture occurs as illustrated in FIG. 3.

In order to create lines of weakness in the concave-convex portion 20 of the disk 16 so that upon rupture the concave-convex portion 20 tears along such lines of weakness and opens in a predetermined manner, scores 26 are formed in the concave-convex portion 20. As will be understood by those skilled in the art, the scores 26 can be positioned on either the convex or the concave side of the concave-convex portion 20 and function to create lines of weakness along which the disks tear when failure occurs. The lines of weakness cause the disk to open fully and reduce the number and incidents of loose pieces tearing away from the disk.

As best shown in FIG. 2, the score pattern formed on the concave-convex portion 20 of the disk 16 is basically comprised of four scores 28 which radiate outwardly from a central portion 32 coinciding with the center of the concave-convex portion 20 toward the transition connection 24. The ends 36 of the scores 28 each connect with a pair of curved scores 42 and 44 which form V-shapes. That is, the exterior ends of the scores 28 each connect to the apex of a V-shape formed by curved scores 42 and 44. Each of the scores 42 and 44 are curved in directions such that the convex sides of the scores face the transition connection 24 of the rupture disk 16. The scores 28 can be zig-zagged or take other shapes, but are preferably straight and are positioned at right angles to each other whereby the concave-convex portion 20 of the rupture disk 16 is divided into quadrants. However, more or less scores can be utilized which intersect at the center of the disk 16 or approach a center portion thereof, and a variety of score patterns other than the pattern described above and illustrated in the drawings can be utilized.

As shown in FIG. 3, in operation of the apparatus 10 and when the disk 16 is of the reverse buckling type, when the fluid pressure exerted on the disk 16 by way of the supporting member 12 exceeds the design rupture pressure of the disk, the concave-convex portion 20 thereof reverses itself and then tears along the lines of weakness created by the scores 28, 42 and 44 forming four large petals generally designated by the numeral 46, and four small petals generally designated by the numeral 48. The same mode of failure occurs when the disk 16 ruptures in the conventional manner except that the petals 46 and 48 fold into the opening in the supporting member 12 and fluid pressure is relieved from the vessel or system being protected by way of the opening in the supporting member 14.

The improved method of the present invention for manufacturing scored rupture disks of the type described above includes the steps of forming a flat section of sheet metal into a desired peripheral shape, such as the circular shape of the disk 16 illustrated in FIG. 2, applying a coating of flexible corrosion-resistant material to one side of the section in a manner whereby a score pattern is left unprotected on a portion of the section, forming the portion of the section containing the score pattern into a concave-convex dome shape, e.g., the concave-convex dome portion 20 of the disk 16, contacting the side of the concave-convex dome portion containing the score pattern with a corrosive fluid for a period of time sufficient to corrode scores corresponding with the score pattern of desired depth into the section and then removing the corrosion-resistant material from the section.

A variety of corrosion-resistant materials can be utilized for forming a coating on the sheet metal section so long as the material is flexible enough to resist cracking or tearing when the section is formed into a concave-convex dome shape. In addition, a variety of techniques can be utilized for applying the corrosion-resistant material to a sheet metal section whereby a desired score pattern is left unprotected on the sheet metal section, and various corrosive fluids such as aqueous acid solutions and techniques for contacting the sheet metal section containing the corrosion-resistant material and score pattern can be utilized.

A particularly suitable and presently preferred corrosion-resistant material for use in accordance with the method of this invention is an asphalt base composition marketed by the Colonial Printing Ink Company under the trade designation ER 1093, Black Acid Resist which is readily dissolved by chloroethane. A presently preferred technique for applying the corrosion-resistant material to the sheet metal section is by means of a screen, commonly referred to as a "silk screen". Referring to FIG. 4, a screen of the type mentioned is illustrated and generally designated by the numeral 50. The screen 50 includes a frame of metal or wood 52 which supports a permeable material 54, such as coarsely woven silk, across its interior. Portions of the coarsely woven material 54 are covered with an impermeable substance such as polyvinyl chloride or other plastic whereby the remaining permeable portion of the material is of desired shape. More specifically, the exterior portion 56 of the material 54 adjacent the frame 52 is covered with a plastic material in a manner such that a central circular permeable portion remains. The desired score pattern to be formed on a metal section is outlined on the central circular portion by additional plastic material. That is, lines of plastic material 60 are formed on the central portion so that the desired score pattern is outlined by impermeable plastic.

In applying a coating of corrosion-resistant material to a sheet metal section 62, the screen 50 is placed over the sheet metal section and the corrosion-resistant material is brushed over the top of the material 54 within the frame 52 so that it passes through the permeable portions thereof onto the sheet metal section. As shown in FIG. 5, this procedure results in a coating 64 of corrosion-resistant material on the sheet metal section 62 containing the desired score pattern 66, i.e., the score pattern 66 is left unprotected on the sheet metal section.

The score pattern 66 is indicated on the drawing in FIG. 5 as the white pattern symmetrically located within the black area 64 which represents the coating 64.

As stated above, after the coating 64 of corrosion-resistant material has been applied to the sheet metal section 62 and allowed to cure, the portion of the section 62 containing the corrosion-resistant material and score pattern 66 is formed into a concave-convex dome shape. This is accomplished by clamping the section between a pair of supporting members for forming concave-convex dome portions in sheet metal sections connected to a source of pressurized fluid, such as pressurized air. A concave-convex dome portion is formed in the section by applying fluid pressure on a side thereof at a level exceeding the yield point of the metal from which the section is formed. After forming, the side of the concave-convex dome portion containing the coating 64 of corrosion-resistant material and score pattern 66 are contacted with a corrosive fluid for a period of time sufficient to corrode scores of a desired depth into the section corresponding with the score pattern. A presently preferred technique for contacting the section with a corrosive fluid is to clamp the section between a second pair of supporting members whereby the side of the section containing the coating 64 of corrosion-resistant material is exposed to one or more spray nozzles connected to a source of aqueous acid solution of constant strength and temperature. The acid solution is sprayed onto the side of the section containing the score pattern at a constant rate and for a period of time sufficient to corrode scores into the section corresponding with the score pattern thereon. After the scores have been formed in the section, it is removed from the supporting members, and the corrosion-resistant material removed from the section by dissolving it in an appropriate solvent.

As will be understood by those skilled in the art, a variety of techniques and conventional equipment can be utilized for applying the coating 64 of corrosion-resistant material to the metal section 62 and for contacting the section with a corrosive fluid so that scores of uniform depth and size are corroded into a surface of the section. Further, the coating 64 can be applied to the metal section 62 before or after forming a concave-convex dome portion in the section and the scores can be formed in the section on either side of the section. However, it is presently preferred to form the scores in the section after the dome portion has been formed therein to insure that the scores are of uniform depth and size, i.e., to avoid deformation of the scores during forming of the dome portion. Further, because the forming of the dome portion results in a thinning out of the metal of the section whereby the dome portion is thinner at the apex than at the sides thereof, when scores of uniform depth are formed in the dome portion, the lines of weakness created thereby are weakest at the center of the dome portion. This is advantageous in that it is desirable in operation of the rupture disk that it tear from the center of the dome portion outwardly.

In a presently preferred method of manufacturing a group of scored reverse buckling rupture disks having known reversal rupture pressures from sheet metal, the sheet metal is first divided into a plurality of flat circular sections or disks of a diameter adapted to fit between the particular size of supporting members to be utilized with the rupture disks produced. A coating of the flexible corrosion-resistant material described above is then applied to one side of each of the sections in the manner described whereby a desired score pattern is left unprotected on a central portion of the sections. Substantially identical concave-convex dome portions are then formed in each of the sections by applying fluid pressure on the sides thereof containing the corrosion-resistant material and score patterns at a level exceeding the yield point of the metal from which the sections are formed. This forming step is controlled so that the concave-convex dome portions formed in each of the sheet metal sections have substantially the same crown heights. The term "crown height" is used herein to mean the distance from the apex of the concave-convex dome portion to the horizontal plane of the peripheral portions of the disk. After the dome portions have been formed, the sections are each contacted with a corrosive fluid, e.g., an aqueous acid solution, by spraying the fluid thereon. As mentioned above, the corrosive fluid concentration, the temperature of the fluid and other variables are closely controlled so that scores of uniform depth are corroded in each of the metal sections. After the scores have been formed in the metal sections, the sections are cleaned in an appropriate manner, and the corrosion-resistant material removed therefrom by dissolving it in an appropriate solvent. One or more of the sections are next clamped between supporting members which are connected to a source of pressurized fluid, with the convex sides of the sections facing the source of pressurized fluid. Increasing fluid pressure is applied to the sections until the concave-convex portions of the sections reverse and rupture, thereby determining the reversal rupture pressure of the sections. The term "reversal rupture pressure" is used herein to mean the fluid pressure exerted on the convex side of the concave-convex dome portion of a scored reverse buckling rupture disk required to cause the concave-convex dome portion to reverse itself and tear along the lines of weakness created therein by the scores.

In order to insure that the disks manufactured in accordance with the method of this invention have a tension rupture pressure such that if the disks reverse but do not open, or if the disks are inadvertently installed between a pair of supporting members upside-down, excessive pressure will not be required to rupture the disks in tension, the ratio of tension rupture pressure to reversal rupture pressure of the disks is controlled at a value of 1.5 or less. The term "tension rupture pressure" is used herein to mean the fluid pressure exerted on the concave side of the concave-convex dome portion of a scored rupture disk required to cause the disk to rupture. Since under applicable pressure vessel and pipe codes, the test pressure of pressure vessels and systems is set at 1.5 times the design pressure of such vessels and systems, it is desirable that scored reverse buckling rupture disks have a reversal rupture pressure at or below the design pressure and a tension rupture pressure no higher than 1.5 times the reversal rupture pressure. This insures that if such disks are installed upside-down or are damaged and reverse without rupturing, rupture will utimately occur before the pressure level within the vessel or system exceeds the test pressure thereof.

If the ratio of tension rupture pressure to reversal rupture pressure of the disks manufactured in the manner described above is greater than 1.5, the steps of reforming the disks and annealing the disks are carried out to reduce such ratio to a value of 1.5 or less. Referring specifically to FIG. 6, a graph is presented showing the effects of such reforming and annealing steps. That is, reforming the disks, which is comprised of subjecting the concave sides of the disks to fluid pressure at a level in the range of from about 85% to about 95% of the tension rupture pressure so that the crown heights of the concave-convex dome portions are increased, has the effect of increasing the reversal rupture pressure of the disks which results in a lowering of the ratio of tension rupture pressure to reversal rupture pressure.

Annealing the disks is the heating of the disks to a temperature in the range of from about 1350° F to about 2000° F for a time period in the range of from about 5 minutes to about 15 minutes and then allowing the disks to cool to room temperature. The annealing step relieves stresses in the disks and has the effect of decreasing the tension rupture pressure more than the reversal rupture pressure which further lowers the ratio of tension rupture pressure to reversal rupture pressure. The particular time and temperature requirements for annealing disks formed from various metals are given in U.S. Pat. No. 3,921,556 assigned to the assignee of this present invention.

In carrying out the method of the present invention, if after the scored reverse buckling rupture disks are manufactured in accordance with the method described above, the ratio of tension rupture pressure to reversal rupture pressure is above 1.5, one reforming step followed by one annealing step generally result in lowering the ratio to 1.5 or less. However, the reforming and annealing steps can be repeated a number of times if required.

In carrying out the method of the present invention for manufacturing a group of scored reverse buckling rupture disks having a desired reversal rupture pressure and having a ratio of tension rupture pressure to reversal rupture pressure of 1.5 or less from sheet metal, the sheet metal is first divided into a plurality of flat sections of desired peripheral shape. A coating of the flexible corrosion-resistant material described above is then applied to one side of each of said sections so that a score pattern is left unprotected on portions of each of the sections. The portions of the sections containing the corrosion-resistant material and the score patterns are then formed into substantially identical concave-convex dome shapes. After forming, two or more of the sections are contacted with a corrosive fluid for equal periods of time whereby substantially identical scores are corroded into the sections. The sections are cleaned and a first of the scored sections is subjected to increasing fluid pressure on the concave side thereof until the dome portion thereof ruptures, thereby determining the tension rupture pressure of the section. Fluid pressure is next applied to the concave side of a second scored section at a level in the range of from about 85% to about 95% of the tension rupture pressure whereby the concave-convex dome portion is reformed, i.e., the crown height increased. The second section is then annealed so that stresses therein are relieved followed by applying increasing fluid pressure on the convex side of the concave-convex dome portion until the second section reverses itself and ruptures thereby determining the reversal rupture pressure of the section. If the reversal rupture pressure obtained is too high or too low, two or more additional sections are contacted with the corrosive fluid for a longer or shorter period of time and the tension rupture pressure and reversal rupture pressure of such sections again determined. The process is repeated on additional sections if necessary while varying the depth of scores corroded into the sections until a desired reversal rupture pressure is obtained. Upon obtaining the desired reversal rupture pressure, the remaining sheet metal sections are contacted with the corrosive fluid for the particular period of time which resulted in the desired reversal rupture pressure followed by the reforming and annealing steps so that a group of scored reverse buckling rupture disks of desired reversal rupture pressure is produced. If after the desired reversal rupture pressure is obtained, the ratio of tension rupture pressure to reversal rupture pressure is above 1.5, the reforming and annealing steps described above can be repeated or varied to achieve a ratio equal to or below 1.5.

As will be understood by those skilled in the art, the particular tension rupture pressure and/or reversal rupture pressure characteristics of scored rupture disks vary with a great number of variables such as the size of the disks, the thickness of the sheet metal employed, the particular metal from which the disks are formed, the crown height of the concave-convex dome portions, the particular score pattern utilized, the depth of the scores formed in the disks, etc. In carrying out the method of the present invention for manufacturing scored rupture disks of desired tension rupture pressure and/or reversal rupture pressure, trial and error techniques are employed to determine the type of sheet metal which should be used, the thickness of the sheet metal required, etc., which are well known to those skilled in the art.

Thus, the present invention is well adapted to carry out the objects and attain the ends and advantages mentioned as well as those inherent therein. While presently preferred embodiments of this invention have been described for purposes of this disclosure, numerous changes in the order of steps and configuration of rupture disks produced will suggest themselves to those skilled in the art, which changes are encompassed within the spirit of this invention and the lawful scope of the appended claims.

What is claimed is:

1. A method of manufacturing a second rupture disk comprising the steps of:
   (a) forming a flat section of sheet metal into a desired peripheral shape;
   (b) applying a coating of flexible corrosion-resistant material to one side of said section in a manner whereby a score pattern is left unprotected on a portion of said section;
   (c) forming said portion of said section containing said score pattern into a concave-convex dome shape;
   (d) contacting said side of said concave-convex dome portion containing said score pattern with a corrosive fluid for a period of time sufficient to corrode scores corresponding with said score pattern of desired depth into said section; and
   (e) removing said corrosion-resistant material from said section.

2. The method of claim 1 wherein said section is formed in a circular shape and said scores radiate outwardly from the center of said concave-convex dome portion of said section.

3. The method of claim 2 wherein said scores are further characterized to include at least three scores radiating outwardly from the center of said concave-convex dome portion of said section towards the periphery of said concave-convex dome portion, the exterior ends of said scores each being connected to the apexes of V-shapes formed by additional scores.

4. A method of manufacturing a group of scored reverse buckling rupture disks having a known rupture pressure from sheet metal comprising:
   (a) dividing said sheet metal into a plurality of flat sections;
   (b) applying a coating of flexible corrosion-resistant material to one side of each of said sections in a manner whereby a score pattern is left unprotected on portions of said sections;
   (c) forming said portions of said sections containing said corrosion-resistant material and said score patterns into substantially identical concave-convex dome shapes;
   (d) contacting the side of said concave-convex dome portions of said sections containing said score patterns with a corrosive fluid for a period of time sufficient to corrode scores corresponding with said score patterns of desired substantially equal depths into said sections;
   (e) removing said corrosion-resistant material from said sections; and
   (f) applying increasing fluid pressure on the convex side of the concave-convex dome portion of one or more of said sections until said dome portion reverses itself and ruptures thereby determining the reversal rupture pressure of said sections.

5. The method of claim 4 which is further characterized to include the steps of:
   (g) applying increasing fluid pressure on the concave side of said concave-convex dome portion of one or more of said sections until said dome portion ruptures thereby determining the tension rupture pressure of said sections;
   (h) applying fluid pressure on the concave side of the concave-convex dome portions of each of the remaining sections at a level below said tension rupture pressure whereby the crown heights of said dome portions are increased and the ratio of the tension rupture pressure to reversal rupture pressure of said sections is decreased;
   (i) annealing said sheet metal sections to relieve stresses therein and to further lower the ratio of the tension rupture pressure to reversal rupture pressure of said sections whereby said ratio is equal to or less than 1.5; and
   (j) repeating step (f) to determine the reversal rupture pressure of said sections.

6. The method of claim 5 wherein the fluid pressure applied in accordance with step (h) is at a level in the range of from about 85% to about 95% of said tension rupture pressure.

7. A method of manufacturing a group of scored reverse buckling rupture disks having a desired reversal rupture pressure and having a ratio of tension rupture pressure to reversal rupture pressure of 1.5 or less from sheet metal comprising the following steps:
   (a) dividing said sheet metal into a plurality of flat sections;
   (b) applying a coating of flexible corrosion-resistant material to one side of each of said sections in a manner whereby score patterns are left unprotected on portions of said sections;
   (c) forming the portions of said sections containing said corrosive-resistant material and said score patterns into substantially identical concave-convex dome shapes;
   (d) contacting said sides of said concave-convex dome portions containing said score patterns of two or more of said sections with a corrosive fluid for equal periods of time whereby substantially identical scores are corroded into said sections;
   (e) removing said corrosion-resistant material from said scored sections;
   (f) applying increasing fluid pressure on the concave side of said concave-convex dome portion of a first of said scored sections until said dome portion ruptures thereby determining the tension rupture pressure of said section;
   (g) applying fluid pressure on the concave side of said concave-convex dome portion of a second of said scored sections at a level in the range of from about 85% to about 95% of said tension rupture pressure whereby the crown height of said dome portion is increased and the ratio of tension rupture pressure to reversal rupture pressure of said section is decreased;

(h) annealing said second scored section to relieve stresses therein and to further decrease the ratio of tension rupture pressure to reversal rupture pressure of said section whereby said ratio is equal to less than 1.5;

(i) applying increasing fluid pressure on the convex side of the concave-convex dome portion of said second scored section until said dome portion reverses itself and ruptures thereby determining the reversal rupture pressure of said sections;

(j) repeating steps (d) through (i) on additional of said sections while varying the times said sections are contacted with said corrosive fluid to thereby vary the depth of scores corroded into said sections until a desired reversal rupture pressure is obtained in step (i); and then (k) carrying out steps (d), (e), (g) and (h) on each of the remaining sections using the time of corrosive fluid contact and corresponding depth of scores which resulted in the desired reversal rupture pressure thereby manufacturing a group of scored reverse buckling rupture disks of desired reversal rupture pressure having a ratio of tension rupture pressure to reversal rupture pressure of 1.5 or less.

8. The method of claim 7 wherein said section is formed in a circular shape and said scores radiate outwardly from a central portion of said concave-convex dome portion of said section.

9. The method of claim 8 wherein said scores are further characterized to include at least three scores radiating outwardly from the center of said concave-convex dome portion of said section toward the periphery of said concave-convex dome portion, the exterior ends of said scores each being connected to the apexes of V-shapes formed by additional scores.

* * * * *